United States Patent [19]

Mueller et al.

[11] Patent Number: 5,252,554
[45] Date of Patent: * Oct. 12, 1993

[54] DRILLING FLUIDS AND MUDS CONTAINING SELECTED ESTER OILS

[75] Inventors: Heinz Mueller, Monheim; Claus-Peter Herold, Mettmann; Stephan von Tapavicza, Erkrath, all of Fed. Rep. of Germany; Douglas J. Grimes, Beaconsfield, England; Jean-Marc Braun, Celle, Fed. Rep. of Germany; Stuart P. T. Smith, Kincardineshire, Scotland

[73] Assignees: Henkel Kommanditgesellschaft auf Aktien, Dusseldorf, Fed. Rep. of Germany; Baroid Limited, Aberdeen, Scotland

[*] Notice: The portion of the term of this patent subsequent to Aug. 3, 2010 has been disclaimed.

[21] Appl. No.: 825,431

[22] Filed: Jan. 21, 1992

Related U.S. Application Data

[63] Continuation of Ser. No. 452,988, Dec. 19, 1989, abandoned.

[30] Foreign Application Priority Data

Dec. 19, 1988 [DE] Fed. Rep. of Germany ....... 3842703

[51] Int. Cl.$^5$ ............................ C09K 7/02; C09K 7/06
[52] U.S. Cl. .................................................. 507/138
[58] Field of Search ......................................... 507/138

[56] References Cited

U.S. PATENT DOCUMENTS

| | | | |
|---|---|---|---|
| 3,979,305 | 9/1976 | Fischer et al. | 252/8.51 X |
| 4,374,737 | 2/1983 | Larson et al. | 252/8.5 |
| 4,436,636 | 3/1984 | Carnicom | 252/8.5 |
| 4,481,121 | 11/1984 | Barthel | 252/8.5 |

FOREIGN PATENT DOCUMENTS

0229912 11/1986 European Pat. Off. .
2158437 5/1985 United Kingdom .

OTHER PUBLICATIONS

"New Base Oil Used In Low-Toxicity Oil Muds" Journal of Petroleum Technology, 1985, P. A. Boyd et al., pp. 137-142.
New Drilling Fluid Technology-Mineral Oil Mud, 1974, R. B. Bennet, pp. 975-981.
Parrish, P. R. "Variability of the Acute Toxicity of Drilling Fluids to Mysids" EPA Report No. EPA/600-/D-88/212, 1988.

*Primary Examiner*—Gary Geist
*Attorney, Agent, or Firm*—Wayne C. Jaeschke; Real J. Grandmaison; Henry E. Millson, Jr.

[57] ABSTRACT

Invert emulsion muds for drilling of gas and oil, which are environmentally safe, and which contain:
A. a continuous oil phase composed predominantly of at least one monocarboxylic acid ester of a $C_2C_{12}$ monofunctional alkanol wherein the monocarboxylic acid contains from 12 to 16 carbon atoms and is aliphatically saturated,
B. a disperse aqueous phase,
C. at least one emulsifier,
D. at least one weighting agent,
E. at least one fluid loss additive, and
F. a mild alkaline reserve.

38 Claims, No Drawings

DRILLING FLUIDS AND MUDS CONTAINING SELECTED ESTER OILS

This application is a continuation of application Ser. No. 07/452,988 filed Dec. 19, 1989 now abandoned.

BACKGROUND OF THE INVENTION

1. Field of the Invention

This invention relates to new drilling fluids based on ester oils and to invert drilling muds based thereon which combine high ecological compatibility with good stability and performance properties.

2. Statement of Related Art

It is known that liquid drilling fluids for sinking bores in rock and bringing up the rock cuttings are slightly thickened, water-based, or oil-based fluid systems. Oil-based systems are being increasingly used in practice particularly in offshore drilling or in the penetration of water-sensitive layers.

Oil-based drilling fluids are generally used in the form of so-called invert emulsion muds which consist of a three-phase system, namely: oil, water and finely divided solids. Such emulsions are of the w/o emulsion type, i.e. the aqueous phase is present in the continuous oil phase in heterogeneous fine dispersion. There are a whole range of additives, including in particular emulsifiers and emulsifier systems, weighting agents, fluid loss additives, alkali reserves, viscosity regulators and the like, for stabilizing the system as a whole and for establishing the desired performance properties. Full particulars can be found, for example, in the Article by P. A Boyd et al entitled "New Base oil Used in Low-Toxicity oil Muds" in Journal of Petroleum Technology, 1985, 137 to 142 and in the Article by R. B. Bennet entitled "New Drilling Fluid Technology—Mineral Oil Mud" in Journal of Petroleum Technology, 1984, 975 to 981 and the literature cited therein.

Oil-based drilling fluids were originally made from diesel oil fractions containing aromatic constituents. For the purposes of detoxification and reducing the ecological problems thus created, it was then proposed to use hydrocarbon fractions substantially free from aromatic compounds —now also known as "nonpolluting oils"—as the continuous oil phase, cf. the literature cited above. Although certain advances were achieved in this way through elimination of the aromatic compounds, a further reduction in the environmental problems caused by drilling fluids of the above type seems to be urgently required. This applies in particular to the sinking of offshore wells for the development of oil and gas sources because the marine ecosystem is particularly sensitive to the introduction of toxic and non-readily degradable substances.

The relevant technology has for some time recognized the significance of ester-based oil phases for solving these problems. Thus, U.S. Pat. Nos. 4,374,737 and 4,481,121 describe oil-based drilling fluids in which nonpolluting oils are said to be used. Non-aromatic mineral oil fractions and vegetable oils of the peanut oil, soybean oil, linseed oil, corn oil and rice oil type, and even oils of animal origin, such as whale oil, are mentioned alongside one another as nonpolluting oils of equivalent rank. The ester oils of vegetable and animal origin mentioned here are all triglycerides of natural fatty acids which are known to be environmentally safe and which, ecologically, are distinctly superior to hydrocarbon fractions, even where they have been dearomaticized.

Interestingly, however, not one of the Examples in the U.S. patents cited above mentions the use of such natural ester oils in invert emulsion drilling muds. Mineral oil fractions are used throughout as the continuous oil phase.

In its general descriptive part, U.S. Pat. No. 4,481,121 mentions not only triglycerides, but also a commercial product "Arizona 208" of the Arizona Chemical Company, Wayne, N.J., which is a purified isooctyl-monoalcohol ester of high-purity tall oil fatty acids. An ester of a monofunctional alcohol and monofunctional carboxylic acids, mentioned for the first time here, is described as equivalent to triglycerides of natural origin and/or dearomaticized hydrocarbon fractions.

The cited U.S. patent does not contain any reproducible Examples relating to the use of such an ester of monofunctional components.

DESCRIPTION OF THE INVENTION

Other than in the operating examples, or where otherwise indicated, all numbers expressing quantities of ingredients or reaction conditions used herein are to be understood as modified in all instances by the term "about".

The investigations on which the present invention is based have shown that the use of readily degradable oils of vegetable and/or animal origin, which was considered in the prior art, is not feasible for practical reasons. The rheologic properties of such oil phases cannot be controlled for the wide temperature range required in practice of 0° to 50° C. on the one hand up to 250° C. and higher on the other hand.

The teaching of the present invention is based on the observation that it is in fact possible to produce oil-based invert drilling fluids of the above type based on ester oils of high environmental compatibility which correspond in their storage and in-use behavior to the best of the hitherto known oil-based drilling fluids, but have the additional advantage of increased environmental compatibility. Two key observations in this regard dominate the teaching according to the invention:

The triglycerides accumulating in the form of natural oils are not suitable for the production of mineral-oil-free oil-based invert drilling fluids, whereas the esters of monofunctional carboxylic acids with monofunctional alcohols derived from those oils or fats are suitable for the production of such drilling fluids. The second key observation is that ester oils of the present type do not in fact show the same in-use behavior as the mineral oil fractions used hitherto based purely on hydrocarbons. In practical application, the ester oils of monofunctional components of the invention undergo partial hydrolysis, resulting in the formation of free fatty acids. These free fatty acids react in turn with the alkaline constituents always present in invert drilling fluids, for example with the alkali reserve used to prevent corrosion, to form the corresponding salts. However, salts of highly hydrophilic bases and the acids having chain lengths of up to about $C_{24}$, more especially the relatively long-chain acids in the range from about $C_{16}$ to $C_{22}$, commonly encountered in fats and oils of natural origin are known to be compounds having comparatively high HLB values which lead in particular to the formation and stabilization of o/w emulsions. Use is made of this to a very considerable extent in the field of detergents and cleaning preparations. However, the formation of undesirably large quantities of such o/w emulsifier systems must interfere with the w/o emulsions required for solving the problem addressed by the invention and, hence, lead to problems. The teaching of the present invention as described in the following shows how invert drilling fluids based on ester oils can be effectively used in practice despite these difficulties inherent in the system.

In a first embodiment, therefore, the present invention relates to the use of selected esters—flowable and pumpable at temperatures in the range of from 0° to 5° C.—of monofunctional $C_{2-12}$, more especially $C_4$-$C_{12}$ alcohols (alkanols) and saturated aliphatic $C_{12-16}$ monocarboxylic acids or mixtures thereof with at most equal quantities of other monocarboxylic acids as the oil phase or at least a substantial part of the oil phase of invert drilling muds which contain in a continuous oil phase a disperse aqueous phase together with emulsifiers, weighting agents, fluid loss additives and, if desired, other standard additives such as gellants.

In another embodiment, the invention relates to mineral-oil-free invert drilling muds which are suitable for the offshore development of oil and gas sources and, in a continuous oil phase based on ester oils, contain a disperse aqueous phase together with emulsifiers, weighting agents, fluid loss additives and, if desired, other standard additives, wherein the oil phase consists at least substantially of esters of monofunctional $C_{2-12}$ alcohols and saturated aliphatic $C_{12-16}$ monocarboxylic acids. According to one preferred element of the invention, the ester oils of the continuous oil phase have a Brookfield (RVT) viscosity of no more than 50 mPa.s at a temperature in the range from 0° to 5° C.

In one particularly preferred embodiment of the two embodiments of the invention as described above, at least the predominant part, i.e. at least 50%, preferably at least 60%, of the ester oils used is based on saturated aliphatic $C_{12}$-$C_{14}$ monocarboxylic acids.

In one important embodiment, the ester oil contains only saturated aliphatic monocarboxylic acids of the broader $C_{12-16}$ range mentioned, but more especially of the $C_{12-14}$ range. However, the invention is by no means confined to this. It can be of advantage to use esters of other carboxylic acids in at most substantially the same quantity as the above esters, but preferably in smaller quantities. Where other esters are present, esters of relatively short-chain aliphatic monocarboxylic acids and/or esters of relatively long-chain carboxylic acids can be present. However, in cases where esters of relatively long-chain carboxylic acids are used, it is preferred at least partly to use corresponding mono- and/or polyolefinically unsaturated, relatively long-chain carboxylic acid derivatives. In this embodiment, suitable mixture components are, especially, mono- and/or polyolefinically unsaturated $C_{16-24}$ and more especially $C_{18-22}$ monocarboxylic acid esters.

In another important and preferred embodiment of the invention which is discussed in more detail hereinafter, significant quantities of strong hydrophilic bases, such as alkali metal hydroxides and/or diethanolamine, are not used in the invert drilling mud where the ester oils defined herein are present.

It is known that state-of-the-art invert drilling muds incorporating a continuous oil phase always contain an alkali reserve, particularly for protection against inrushes of $CO_2$ and/or $H_2S$ into the drilling mud and hence for protecting metal parts of the drill pipe against corrosion. A useful alkali (alkaline) reserve in the context of the teaching of the invention comprises the addition of lime (calcium hydroxide) or the co-use of more weakly basic metal oxides, for example of the zinc oxide type and/or other zinc compounds. Further particulars of these elements of the teaching of the invention are given hereinafter. The ester oils selected in accordance with the invention which are intended to form the entire continuous oil phase of the invert drilling muds or at least the predominant part thereof are discussed first in the following.

The ester oils used in accordance with the invention of monofunctional alcohols and selected monocarboxylic acids can be derived from either branched or branched hydrocarbon chains. Preferred are the esters of straightchain acids. Saturated $C_{12-16}$ and more especially $C_{12-14}$ monocarboxylic acids and monofunctional alcohols having the C chain lengths defined in accordance with the invention can form ester oils which show adequate rheologic properties, even down to temperatures in the range of from 0° to 5° C., and in particular are flowable and pumpable in that temperature range. In the context of the invention, preferred esters for the oil phase of drilling muds are saturated compounds which have a Brookfield (RVT) viscosity at a temperature of 0° to 5° C. of no more than 50 mPa.s and preferably of no more than 40 mPa.s. By selecting suitable components for the ester-forming reaction, it is possible to adjust the viscosity at temperatures in the above-mentioned range to values of at most 30 mPa.s, for example in the range of from 10 to 20 mPa.s. It is clear that this affords important advantages for offshore drilling where the surrounding water can have very low temperatures.

In a preferred embodiment, the ester oils used in accordance with the invention based on selected individual components or on ester mixtures have solidification values (pour point and setting point) below $-10°$ C. and more especially below $-15°$ C. Despite this high mobility at low temperatures, the molecular size of the ester oil in accordance with the invention ensures that the flash points of the ester oils are sufficiently high, being at least 80° C., but generally exceeding a temperature limit of about 100° C. Ester oils having flash points above 150°-160° C. are preferred. It is possible to produce ester oils of the described type which have flash points of 185° C. or higher.

In another important embodiment, the ester oils of the range required in accordance with the invention for the saturated $C_{12-16}$ monocarboxylic acids are derived from materials of predominantly vegetable origin. Carboxylic acids or carboxylic acid mixtures predominantly containing saturated monocarboxylic acids within the stated range can be obtained, for example, from renewable triglycerides, such as coconut oil, palm kernel oil and/or babassu oil. Fatty acid mixtures of this origin normally contain a limited quantity of lower fatty acids ($C_{6-10}$) of generally at most about 15%. Their content of $C_{12-14}$ acids is by far predominant, generally making up at least 50% and normally 60% or more of the carboxylic acid mixture. The small remainder consists of higher fatty acids, with unsaturated components playing a considerable role. Accordingly, carboxylic acid mixtures of this type, by virtue of their natural structure, readily lead to materials having satisfactory rheologic properties.

In one embodiment of the invention, suitable mixture components likewise of natural origin are, in particular, monofunctional ester oils of the type described in co-pending application Ser. No. 07/452,457 filed of even date herewith, "The Use of Selected Ester oils in Drilling Fluids and Muds") now abandoned. In the context of the teaching of the present invention, however, these mixture components are preferably used in small quantities (at most about 49%, based on the ester oil mixture). To complete the disclosure of the invention, this class of possible mixture components is briefly discussed in the following. Further particulars can be found in the above co-pending application, which is incorporated herein by reference.

These possible mixture components are esters of monofunctional $C_{2-12}$ alcohols and mono- and/or polyolefinically unsaturated $C_{16-24}$ monocarboxylic acids. In this case, too, the carboxylic acids can be derived from unbranched or branched hydrocarbon chains, particular significance again being attributed the straight-chain acids. Esters of the higher chain lengths in question here are flowable and pumpable down to temperatures of 0° to 5° C., providing an adequate level of olefinically unsaturated ester constituents is guaranteed. In the preferred embodiment of the invention, therefore, esters of this type, of which more than 70% by weight and preferably more than 80% by weight are derived from olefinically unsaturated $C_{16-24}$ carboxylic acids are used. Important natural starting materials are carboxylic acid mixtures which contain at least 90% by weight olefinically unsaturated carboxylic acids in the above C range. The unsaturated carboxylic acids may be mono- and/or polyolefinically unsaturated. Where carboxylic acids or carboxylic acid mixtures of natural origin are used, the double ethylenic double bond in particular and, to a lesser extent, even a triple ethylenic double bond per carboxylic acid molecule provides benefits in addition to a single ethylenic double bond in the molecule.

These esters of unsaturated, relatively long-chain monocarboxylic acids used as a mixture component with the esters of the present invention preferably have solidification values (pour point and setting point) below −10° C. and more especially below −15° C. By virtue of the size of their molecule, these mixture components also have flash points in the desired range, i.e. at least above 80° C., preferably above 100° C. and more especially above 160° C. In the preferred embodiment, mixture components of this type have Brookfield (RVT) viscosities at 0° to 5° C. of no more than 55 mPa.s and preferably of at most 45 mPa.s.

Among these highly unsaturated mixture components, there are two sub-classes of particular importance.

The first of these sub-classes is based on unsaturated $C_{16-24}$ monocarboxylic acids of which no more than about 35% by weight are diolefinically and, optionally, polyolefinically unsaturated. In their case, therefore, the content of polyunsaturated carboxylic acid residues in the ester oil is comparatively limited. Within this sub-class, however, it is preferred that at least about 60% by weight of the carboxylic acid residues are monoolefinically unsaturated.

In contrast to the first sub-class described above, the second sub-class of ester oils of practical significance is derived from $C_{6-24}$ monocarboxylic acid mixtures of which more than 45% by weight and preferably more than 55% by weight are derived from diolefinically and/or polyolefinically unsaturated acids within the C range mentioned.

The most important monoethylenically unsaturated carboxylic acids within the range in question here are hexadecenoic acid [palmitoleic acid ($C_{16}$), oleic acid ($C_{18}$), the related ricinoleic acid ($C_{18}$) and erucic acid ($C_{22}$)]. The most important di-unsaturated carboxylic acid within the range in question here is linoleic acid ($C_{18}$) while the most important triethylenically unsaturated carboxylic acid is linolenic acid ($C_{18}$).

Selected individuals of the ester type formed from an unsaturated monocarboxylic acid and a monoalcohol may be used as mixture component. One example of such esters are the esters of oleic acid, for example of the oleic acid isobutyl ester type. So far as the rheology of the system is concerned and/or for reasons of availability, it is frequently desirable to use acid mixtures.

Vegetable oils of natural origin, of which the hydrolysis or transesterification gives mixtures of carboxylic acids or carboxylic acid esters of the first sub-class mentioned above are, for example palm oil, peanut oil, castor oil and, in particular, rapeseed oil. Suitable rapeseed oils are both traditional types of high erucic acid content and also the more modern types of reduced erucic acid content and increased oleic acid content.

Carboxylic acid mixtures of the second sub-class mentioned above are also widely available from natural fats of vegetable and/or animal origin. Classic examples of oils which have a high content of $C_{16-18}$ or $C_{16-22}$ carboxylic acids and which, at the same time, contain at least about 45% of at least diethylenically unsaturated carboxylic acids are cottonseed oil, soybean oil, sunflower oil and linseed oil. The tall oil acids isolated during the recovery of cellulose also fall within this range. A typical example of an animal starting material for the production of corresponding carboxylic acid mixtures is fish oil, particularly herring oil.

Another factor to be taken into consideration in the choice of the saturated ester oils used in accordance with the invention, particularly the mixtures of ester oils with the unsaturated ester oils described above, is that saturated carboxylic acid esters containing 16 and more C atoms can have comparatively high boiling points and hence readily give rise to rheologic difficulties. According to the invention, therefore, saturated carboxylic acids containing 16–18 or more C atoms preferably make up no more than about 20% by weight and, in particular, no more than about 10% by weight of the ester oils of the invention.

By contrast, the presence of saturated carboxylic acids containing less than 12 carbon atoms is more acceptable. On the contrary, they can be valuable mixture components for the ester oil phases selected in accordance with the invention. Their esters are as invulnerable to oxidation under practical in-use conditions as the saturated principal ester components of the invention, particularly in the $C_{12-14}$ range. The rheologic properties of the lower fatty acid esters promote the objective of the invention, namely to replace the pure hydrocarbon oils hitherto solely used in practice at least partly, preferably predominantly or even completely by ester oils or ester oil fractions.

The alcohol radicals of the esters or ester mixtures of the invention are preferably derived from straightchain and/or branched-chain saturated alcohols, preferably alcohols containing at least 4 ° C. atoms and, more preferably to alcohols containing up to about 10 ° C. atoms. The alcohols can also be of natural origin, in which case they have normally been obtained from the corresponding carboxylic acids or their esters by hydrogenating reduction.

However, the invention is by no means limited to starting materials of natural origin. Both on the monoalcohol side and on the monocarboxylic acid side, the starting materials of natural origin can be partly or completely replaced by corresponding components of synthetic origin. Typical examples of alcohols are the corresponding oxo alcohols (branched alcohols) and the linear alcohols obtained by the Ziegler process. Similarly, monocarboxylic acid components present in particular in carboxylic acid mixtures can be derived from petrochemical synthesis. However, the advantages of starting materials of natural origin lie in particular in their proven lower toxicologic values, their ready degradability and their ready accessibility. The natural destruction of the used oil mud ultimately required presupposes that ester oils of the type described herein be both aerobically and anaerobically degradable.

However, another important aspect of using ester oils of the present invention as sole or predominant constituents in invert oil Muds has to be taken into consideration. This concerns the difficulty mentioned at the beginning that, in principle, the carboxylic acid esters are vulnerable to hydrolysis and, accordingly, behave differently from the pure hydrolysis-stable hydrocarbon oils hitherto used.

Invert drilling muds of the present type contain the finely disperse aqueous phase, normally together with the continuous oil phase, in quantities of from 5 to 45% by weight and preferably in quantities of from 5 to 25% by weight. Preferred is the range of 10 to 25% by weight of disperse aqueous phase. This precondition from the constitution of conventional drilling muds also applies to the ester-based invert drilling muds of the present invention. It is clear that, in continuous practical operation, disturbances of the equilibrium can occur in the multiphase system as a result of partial ester hydrolysis.

The situation is complicated by the fact that, in practice, drilling muds of the present type always contain an alkali reserve. This alkali reserve is particularly important in affording protection against corrosion caused by unexpected inrushes of acidic gases, particularly $C_2O$ and/or $H_2S$. The danger of corrosion to the drill pipe requires the safe establishment of pH values at least in the mildly alkaline range, for example in the range of from pH 8.5 to 9 and higher.

In oil muds based on pure hydrocarbon fractions as the oil phase, strongly alkaline and, at the same time, highly hydrophilic inorganic or organic additives are generally used in practice without any difficulty. The alkali metal hydroxides and, in particular, sodium hydroxide as well as highly hydrophilic organic bases, e.g. diethanolamine and/or triethanolamine are particularly typical additives for binding impurities of $H_2S$. In addition to and/or instead of the above highly hydrophilic inorganic and organic bases, lime or even more weakly basic metal oxides, especially zinc oxide and other zinc compounds, are particularly important as the alkali reserve. Lime in particular is widely used as an inexpensive alkalizing agent. It may safely be used in comparatively high quantities of, for example, from 5 to 10 lb/bbl (lime/oil mud) or even higher.

The use of ester-based oil muds of the present invention requires a departure from standard practice so far as these variables are concerned. It is of course necessary in the present case, too, to ensure that the pH value of the drilling mud is kept at least in the mildly alkaline range and that a sufficient quantity of an alkaline reserve is available for unexpected inrushes of, in particular, acidic gases. At the same time, however, the ester hydrolysis should not be undesirably promoted and/or accelerated by such an alkaline content.

Thus, in the preferred embodiment of the invention, no significant quantities of highly hydrophilic, inorganic and/or organic bases are used in the oil mud. In particular, the invention does not use alkali metal hydroxides or highly hydrophilic amines of the diethanolamine and/or triethanolamine type. Lime can be effectively used as the alkali reserve. In that case, however, it is best to limit the maximum quantity of lime used in the drilling mud to around 2 lb/bbl or slightly lower, for example to between 1 and 1.8 lb/bbl (lime/drilling mud). In addition to or instead of lime, it is also possible to use other known alkaline reserves, including in particular the less basic metal oxides of the zinc oxide type. However, even where acid-binding agents such as these are used, it is important not to use excessive amounts to prevent unwanted premature ageing of the drilling mud accompanied by an increase in viscosity and hence a deterioration in the rheologic properties. The particular aspect of the teaching according to the invention prevents or at least limits the formation of unwanted quantities of highly active o/w emulsifiers to such an extent that the favorable rheologic properties are maintained for long periods in operation, even in the event of thermal ageing. In relation to the recommendations of the prior art which have hitherto remained in the realm of theoretical considerations, this represents a significant advance in the art which actually enables the low toxic properties of ester oils of the present type to be utilized in practice for the first time.

The esters based on saturated $C_{12-16}$ monocarboxylic acids defined in accordance with the invention, which flow and can be pumped at temperatures in the range from 0° to 5° C., generally make up at least about half the continuous oil phase of the drilling mud. However, preferred oil phases are those in which esters of the type according to the invention are very much predominantly present. In one particularly important embodiment of the invention, the oil phase consists almost entirely of such ester oils. As discussed above, components suitable for mixing with the ester oils defined in accordance with the invention are the ester compounds described in the above co-pending application Ser. No. 07/452,457. The invention also encompasses mixtures with such other selected ester oils.

The following rheologic data apply to the rheology of preferred invert drilling muds according to the invention: plastic viscosity (PV) in the range of from 10 to 60 mPa.s and preferably in the range of from 15 to 40 mPa.s, yield point (YP) in the range of from 5 to 40 lb/100 ft² and preferably in the range of from 10 to 25 lb/100 ft², as measured at 50° C. Full information on the determination of these parameters, on the measurement techniques used and on the otherwise standard composition of the invert oil muds described herein can be found in the prior art cited above and, for example, in "Manual of Drilling Fluids Technology" published by BAROID DRILLING FLUIDS, INC., cf. in particular the Chapter entitled "Mud Testing—Tools and Techniques" and "Oil Mud Technology", which is freely available to interested experts. In the interests of fullness of disclosure, the following descriptions of other components of the drilling muds of the invention are given.

Emulsifiers suitable for use in practice are systems which are capable of forming the required w/o emulsions. Selected oleophilic fatty acid salts, for example those based on amidoamine compounds, are particularly suitable, examples being described in the previously cited U.S. Pat. No. 4,374,737 and the literature cited therein. One particularly suitable type of emulsifier is the product marketed under the name of "EZ-MUL ™" by BAROID DRILLING FLUIDS, INC., of Aberdeen, Scotland. Emulsifiers of this type are marketed in the form of concentrates and can be used, for example, in quantities of from 2.5 to 5% by weight and more especially in quantities of from 3 to 4% by weight, based in each case on the ester oil phase.

In practice, organophilic lignite is used as a fluidloss additive and, hence, for forming an impervious coating in the form of a substantially water-impermeable film over the walls of the well. Suitable quantities are, for example, in the range of from 15 to 20 lb/bbl or in the range of from 5 to 7% by weight, based on the ester oil phase.

In drilling muds of the present type, the thickener normally used to create viscosity is a cationically modified, finely divided organophilic bentonite which can be used in quantities of from 8 to 10 lb/bbl or in the range of from 2 to 44 by weight, based on the ester oil phase.

The weighting agent normally used in practice to establish the necessary pressure equalization is baryta which is added in quantities adapted to the particular conditions to be expected in the well. For example, it is possible by addition of baryta to increase the specific gravity of the drilling mud to values of up to 2.5 and preferably in the range of from 1.3 to 1.6.

In invert drilling muds of the present type, the disperse aqueous phase is charged with soluble salts, generally calcium chloride and/or potassium chloride, the aqueous phase preferably being saturated with the soluble salt at room temperature.

The emulsifiers or emulsifier systems discussed above can also be used to improve the oil wettability of the inorganic weighting materials. In addition to the aminoamides already mentioned, alkyl benzenesulfonates and imidazoline compounds are as further examples. Additional information on the relevant prior art can be found in the following literature references: GB 2,158,4371, EP 229 912 and DE 32 47 123.

One important application for the new drilling fluids and muds is in offshore drilling for the development of oil and/or gas sources. The drilling fluids and muds of the invention have high ecological compatibility. The use of the new drilling fluids and muds is of particular importance in, but is not limited to, the offshore sector. The new drilling fluids and muds can also be used quite generally for land-supported drilling, including for example geothermal drilling, water drilling, geoscientific drilling and mine drilling. In this case, too, the ester-based drilling fluids selected in accordance with the invention basically simplify ecotoxic problems to a considerable extent.

In addition to the above advantages, the drilling fluids based in accordance with the invention on the use or co-use of ester oils of the described type are also distinguished by distinctly improved lubricity. This is particularly important when the path of the drill pipe and hence the well deviate from the vertical during drilling, for example at considerable depths. In such cases, the rotating drill pipe readily comes into contact with the well wall and embeds itself therein. Ester oils in accordance with the invention have a distinctly better lubricating effect than the mineral oils hitherto used, which is an important advantage of the teaching of the invention.

The invention will be illustrated but not limited by following examples.

EXAMPLES

In Examples 1 and 2 below and the Comparison Examples, distilled lauric acid/n-hexyl ester is used as the ester oil for forming the continuous oil phase. It is a whitish-yellow liquid with a flash point above 165° C., a pour point below −5° C., a density (20° C.) of from 0.857 to 0.861, an iodine value and an acid value both below 1, a water content below 0.3% and the following viscosity data (Brookfield mPa.s): 22.5 to 25.5 at −5° C.; 15 to 18 at +2° C.; 15 to 18 at +5° C.; approx. 15 at +10° C.; 12 to 14 at 20° C.

EXAMPLE 1

A water in oil invert drilling mud was prepared in known manner from the components listed below, after which the viscosity data Of the material before and after ageing were determined as follows:

Measurement of viscosity at 50° C. in an NL Baroid Fann 35 viscosimeter. Plastic viscosity (PV), yield point (YP) and gel strength (lb/100 ft$^2$) after 10 secs. and 10 mins. were determined in known manner.

The measurements were carried out both before and after ageing of the material, ageing being obtained by treatment in an autoclave—in a so-called roller over—for 16 h at 125° C.

The following composition was selected for the drilling mud:

| | | |
|---|---|---|
| 230 ml | ester oil | |
| 26 ml | water | |
| 6 g | organophilic bentonite (GELTONE ™ II, a product of BAROID DRILLING FLUIDS, INC.) | |
| 6 g | organophilic lignite (DURATONE ™, a product of BAROID DRILLING FLUIDS, INC.) | |
| 1 g | lime | |
| 6 g | water in oil emulsifier (EZ-MUL ™, a product of BAROID DRILLING FLUIDS, INC.) | |
| 346 g | barite | |
| 9.2 g | CaCl$_2$ × 2H$_2$O | |

In this formulation, approximately 1.35 g lime correspond to the limit of 2 lb/bbl.

The characteristic data determined on the material before and after ageing as described above are shown in the following Table:

| | Unaged material | Aged material |
|---|---|---|
| Plastic viscosity (PV) | 28 | 28 |
| Yield point (YP) | 11 | 14 |
| Gel strength (lb/100 ft$^2$) | | |
| 10 seconds | 5 | 6 |
| 10 minutes | 7 | 8 |

COMPARISON EXAMPLE 1

The invert drilling mud of Example 1 was prepared using the same quantities except that, on this occasion, the quantity of lime was increased three times (3 g).

The characteristic data determined before and after ageing of the material are shown in the following Table:

|  | Unaged material | Aged material |
| --- | --- | --- |
| Plastic viscosity (PV) | 31 | 72 |
| Yield point (YP) | 8 | 59 |
| Gel strength (lb/100 ft$^2$) |  |  |
| 10 seconds | 5 | 13 |
| 10 minutes | 7 | 74 |

EXAMPLE 2

A particularly heavily weighted invert drilling mud was prepared in accordance with the following formulation:

| 184 ml | ester oil |
| --- | --- |
| 10 ml | water |
| 2 g | organophilic bentonite (GELTONE TM II, a product of BAROID DRILLING FLUIDS, INC.) |
| 20 g | organophilic lignite (DURATONE TM, a product of BAROID DRILLING FLUIDS, INC.) |
| 1 g | lime |
| 10 g | water in oil emulsifier (EZ-MUL TM, a product of BAROID DRILLING FLUIDS, INC.) |
| 568 g | barite |
| 4.8 g | CaCl$_2$ × 2 H$_2$O |

The characteristic data of the material were determined before and after ageing as in Example 1. The values obtained are shown in the following Table:

|  | Unaged material | Aged material |
| --- | --- | --- |
| Plastic viscosity (PV) | 20 | 81 |
| Yield point (YP) | 12 | 16 |
| Gel strength (lb/100 ft$^2$) |  |  |
| 10 seconds | 8 | 8 |
| 10 minutes | 10 | 11 |

In this Example, approximately 1.04 g lime correspond to the limit of 2 lb/bbl.

COMPARISON EXAMPLE 2

The heavily weighted formulation of Example 2 was repeated, except that the lime content was doubled (2 g).

The characteristic data of the material before and after ageing were again determined and are shown in the following Table:

|  | Unaged material | Aged material |
| --- | --- | --- |
| Plastic viscosity (PV) | 78 | 73 |
| Yield point (YP) | 37 | 59 |
| Gel strength (lb/100 ft$^2$) |  |  |
| 10 seconds | 12 | 18 |
| 10 minutes | 16 | 27 |

The ester oil used to form the continuous oil phase in Examples 3 and 4 below is an ester mixture of substantially saturated fatty acids based on palm kernel oil and 2-ethyl hexanol, of which by far the predominant part is made up of $C_{12-14}$ fatty acids and which corresponds to the following composition:

| $C_8$: | 3.5 to 4.5% by weight |
| --- | --- |
| $C_{10}$: | 3.5 to 4.5% by weight |
| $C_{12}$: | 65 to 70% by weight |
| $C_{14}$: | 20 to 24% by weight |
| $C_{16}$: | Approx. 2% by weight |
| $C_{18}$: | 0.3 to 1% by weight |

The ester mixture is present in the form of a light yellow liquid with a flash point above 165° C., a pour point below −10° C., a density (20° C.) of 0.86 and an acid value below 0.3. In the low-temperature range, the ester mixture shows the following viscosity data (Brookfield, Mass.): −5° C. 20 to 22; 0° C. 16 to 17; +5° C. 13 to 15; 10° C. approx. 11; 20° C. 7 to 9.

EXAMPLE 3

As in the preceding Examples, a w/o invert drilling mud was prepared from the following components. The viscosity data of the material were determined before and after ageing.

The following composition was selected for the drilling mud:

| 230 ml | ester oil |
| --- | --- |
| 6 g | emulsifier 1 (INVERMUL TM NT, a product of NL Baroid of Aberdeen, Scotland) |
| 26 g | water |
| 6 g | organophilic bentonite (GELTONE TM) |
| 12 g | organophilic lignite (DURATONE TM) |
| 1.5 g | lime |
| 6 g | emulsifier 2 (EZ-MUL TM) |
| 346 g | barite |
| 9.2 g | CaCl$_2$ × 2H$_2$O |

The characteristic data determined on the material before and after ageing are shown in the following table:

|  | Unaged material | Aged material |
| --- | --- | --- |
| Plastic viscosity (PV) | 37 | 30 |
| Yield point (YP) | 16 | 14 |
| Gel strength (lb/100 ft$^2$) |  |  |
| 10 seconds | 7 | 5 |
| 10 minutes | 10 | 9 |

EXAMPLE 4

A 40% water-containing w/o invert drilling mud having the following composition was prepared using the ester oil of Example 3.

| 350 ml | ester oil |
| --- | --- |
| 20 g | emulsifier (EZ-MUL TM) |
| 8 g | organophilic lignite (DURATONE TM) |
| 4 g | lime |
| 6 g | organophilic bentonite (GELTONE TM) |
| 234 ml | water |
| 99 g | CaCl$_2$ × 2H$_2$O |
| 150 g | barite |

The material showed the following plastic viscosity and yield point values before and after ageing:

|  | Unaged material | Aged material |
| --- | --- | --- |
| Plastic viscosity (PV) | 33 | 32 |

-continued

|  | Unaged material | Aged material |
|---|---|---|
| Yield point (YP) | 77 | 56 |

We claim:

1. An invert emulsion drilling mud free of mineral oil and substantially free from highly hydrophilic basic materials selected from the group consisting of alkali metal hydroxides and amines selected from diethanolamine and triethanolamine, consisting essentially of
   A. a continuous oil phase composed predominantly of at least one monocarboxylic acid ester of a $C_2$–$C_{12}$ monofunctional alkanol wherein the monocarboxylic acid contains from 12 to 16 carbon atoms and is aliphatically saturated,
   B. a disperse aqueous phase,
   C. at least one emulsifier,
   D. at least one weighting agent,
   E. a viscosifier,
   F. at least one fluid loss additive, and
   G. a mildly alkaline alkali reserve component consisting of lime in a quantity not exceeding about 2 lb/bbl of said drilling mud.

2. The invert emulsion drilling mud of claim 1 wherein the mildly alkaline alkali reserve component consists of from about 1 to 1.8 lbs./bbl of lime.

3. The invert emulsion mud of claim 1 wherein in the at least one monocarboxylic acid ester of component A the monocarboxylic acid is obtained from coconut oil, palm kernel oil, or babassu oil.

4. The invert emulsion mud of claim 1 wherein the disperse aqueous phase B contains at least one of $CaCl_2$ or KCl as a dissolved salt.

5. The invert emulsion mud of claim 1 wherein from about 5 to about 45% by weight of component B is present therein.

6. The invert emulsion mud of claim 5 wherein from about 5 to about 25% by weight of component B is present therein.

7. The invert emulsion mud of claim 1 wherein component A has a Brookfield (RVT) viscosity at 0° to 5° C. of no more than about 50 mPa.s.

8. The invert emulsion mud of claim 1 wherein the invert emulsion has a plastic viscosity (PV) in the range of from about 10 to about 60 mPa.s and a yield point (YP) in the range of from about 5 to about 40 lb/100 ft$^2$, as measured at 50° C.

9. The invert emulsion mud of claim 1 wherein the at least one monocarboxylic acid ester of component A has a pour point and setting point below about −10° C., and a flash point above about 100° C.

10. The invert emulsion mud of claim 9 wherein said pour point and setting point is below about −15° C., and the flash point is above about 160° C.

11. The invert emulsion mud of claim 1 wherein in the at least one monocarboxylic acid ester of component A the monocarboxylic acid is linear.

12. The invert emulsion mud of claim 1 wherein in the at least one monocarboxylic acid ester of component A the alcohol moiety contains from 4 to 10 carbon atoms and is saturated, straight chain or branched.

13. The invert emulsion mud of claim 1 wherein in the at least one monocarboxylic acid ester of component A at least about 60% by weight thereof are esters of saturated aliphatic $C_{12-14}$ monocarboxylic acids.

14. In the development of a source of oil or gas by drilling, the improvement comprising pumping the invert emulsion mud of claim 1 into the source being drilled.

15. A drilling fluid free of mineral oil for use in an invert drilling mud that is substantially free from highly hydrophilic basic materials selected from the group consisting of alkali metal hydroxides and amines selected from diethanolamine and triethanolamine, consisting of
   A. a continuous oil phase composed predominantly of at least one monocarboxylic acid ester of a $C_2$–$C_{12}$ monofunctional alkanol wherein the monocarboxylic acid contains from 12 to 16 carbon atoms, and is aliphatically saturated, and
   B. a disperse aqueous phase.

16. The drilling fluid of claim 15 wherein component A has a brookfield (RVT) viscosity at 0° to 5° C. of no more than about 50 mPa.s.

17. The drilling fluid of claim 15 wherein the at least one monocarboxylic acid ester of component A has a pour point and setting point below about −10° C., and a flash point above about 100° C.

18. The drilling fluid of claim 17 wherein said pour point and setting point is below about −15° C., and the flash point is above about 160° C.

19. The drilling fluid of claim 15 wherein in the at least one monocarboxylic acid ester of component A the monocarboxylic acid is linear.

20. The drilling fluid of claim 15 wherein in the at least one monocarboxylic acid ester of component A the alcohol moiety contains from 4 to 10 carbon atoms and is saturated straight chain or branched.

21. The drilling fluid of claim 15 wherein in the at least one monocarboxylic acid ester of component A at least about 60% by weight thereof are esters of saturated aliphatic $C_{12-14}$ monocarboxylic acids.

22. The drilling fluid of claim 21 wherein the at least one monocarboxylic acid ester is obtained from coconut oil, palm kernel oil, or babassu oil.

23. An invert emulsion drilling mud free of mineral oil and substantially free from highly hydrophilic basic materials selected from the group consisting of alkali metal hydroxides and amines selected from diethanolamine and triethanolamine, consisting essentially of
   A. a continuous oil phase composed predominantly of at least one monocarboxylic acid ester of a $C_2$–$C_{12}$ monofunctional alkanol wherein the monocarboxylic acid contains from 12 to 16 carbon atoms and is aliphatically saturated,
   B. a disperse aqueous phase, and
   C. a mildly alkaline alkali reserve component selected from the group consisting of lime and a weakly basic metal oxide in an amount to maintain a plastic viscosity in the range of from about 10 to about 60 mPa.s and a yield point in the range of from about 5 to about 40 lb/100 ft$^2$ as measured at 50° C. of said drilling mud.

24. The invert emulsion mud of claim 23 wherein from about 5 to about 45% by weight of component B is present therein.

25. The invert emulsion mud of claim 24 wherein from about 5 to about 25% by weight of component B is present therein.

26. The invert emulsion mud of claim 23 wherein component A has a Brookfield (RVT) viscosity at 0° to 5° C. of no more than about 50 mPa.s.

27. The invert emulsion mud of claim 23 wherein the disperse aqueous phase B contains at least one of $CaCl_2$ or KCl as a dissolved salt.

28. The invert emulsion mud of claim 23 wherein the at least one monocarboxylic acid ester of component A has a pour point and setting point below about $-10°$ C., and a flash point above about $100°$ C.

29. The invert emulsion mud of claim 28 wherein said pour point and setting point is below about $-15°$ C., and the flash point is above about $160°$ C.

30. The invert emulsion mud of claim 23 wherein in the at least one monocarboxylic acid ester of component A the monocarboxylic acid is linear.

31. The invert emulsion mud of claim 23 wherein in the at least one monocarboxylic acid ester of component A the alcohol moiety contains from 4 to 10 carbon atoms and is saturated, straight chain or branched.

32. The invert emulsion mud of claim 23 wherein in the at least one monocarboxylic acid ester of component A at least about 60% by weight thereof are esters of saturated aliphatic $C_{12-14}$ monocarboxylic acids.

33. The invert emulsion mud of claim 32 wherein the at least one monocarboxylic acid ester is obtained from coconut oil, palm kernel oil, or babassu oil.

34. In the development of a source of oil or gas by drilling, the improvement comprising pumping the invert emulsion mud of claim 4 into the source being drilled.

35. In the development of a source of oil or gas by drilling, the improvement comprising pumping the invert emulsion mud of claim 8 into the source being drilled.

36. In the development of a source of oil or gas by drilling, the improvement comprising pumping the invert emulsion mud of claim 11 into the source being drilled.

37. In the development of a source of oil or gas by drilling, the improvement comprising pumping the invert emulsion mud of claim 13 into the source being drilled.

38. In the development of a source of oil or gas by drilling, the improvement comprising pumping the invert emulsion mud of claim 23 into the source being drilled.

* * * * *

Disclaimer

5,252,554—Heinz Mueller, Monheim; Claus-Peter Herold, Mettmannn; Stephan von Tapavicza, Erkrath, all of Fed. Rep. of Germany; Douglas J. Grimes, Beaconsfield, England; Jean-Marc Braun, Celle, Fed. Rep. of Germany; Stuart P. T. Smith, Kincardineshire, Scotland. DRILLING FLUIDS AND MUDS CONTAINING SELECTED ESTER OILS. Patent dated Oct. 12, 1993. Disclaimer filed July 21, 1997, by the assignee, Henkel Kommanditgesellschaft auf Aktien and Baroid Limited.

The term of this patent shall not extend beyond the expiration date of Pat. Nos. 5,403,822; 5,318,954; 5,348,938; and 5,232,910.

*(Official Gazette, September 8, 1998)*